United States Patent
Nguyen (10) Patent No.: US 9,392,158 B2
(45) Date of Patent: Jul. 12, 2016

(54) METHOD AND SYSTEM FOR INTELLIGENT DYNAMIC AUTOFOCUS SEARCH

(71) Applicant: Nvidia Corporation, Santa Clara, CA (US)

(72) Inventor: Hugh Phu Nguyen, Milpitas, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 0 days.

(21) Appl. No.: 13/645,274

(22) Filed: Oct. 4, 2012

(65) Prior Publication Data

US 2014/0099090 A1 Apr. 10, 2014

(51) Int. Cl.
 *G03B 3/00* (2006.01)
 *G03B 13/00* (2006.01)
 *H04N 5/232* (2006.01)
 *G03B 13/36* (2006.01)

(52) U.S. Cl.
 CPC ............ *H04N 5/23212* (2013.01); *G03B 13/36* (2013.01)

(58) Field of Classification Search
 CPC ........................... G02B 7/365; H04N 5/23212
 USPC .................................. 396/102, 127; 348/355
 See application file for complete search history.

(56) References Cited

U.S. PATENT DOCUMENTS

| 5,075,777 | A | | 12/1991 | Murata |
| 5,115,262 | A | * | 5/1992 | Komiya ..................... 396/91 |
| 5,838,374 | A | | 11/1998 | Kikuchi |
| 5,847,874 | A | | 12/1998 | Sasao et al. |
| 6,130,417 | A | | 10/2000 | Hashimoto |
| 6,456,737 | B1 | | 9/2002 | Woodfill et al. |
| 7,020,783 | B2 | | 3/2006 | Vange et al. |
| 7,236,470 | B1 | | 6/2007 | Bims |

(Continued)

FOREIGN PATENT DOCUMENTS

| EP | 1953903 | 8/2008 |
| WO | 2013078045 | 5/2013 |

(Continued)

OTHER PUBLICATIONS

Pierpaolo Baccichet, "H.264/AVC compliant solutions for SLEP-based error robustness and for video surveillance", I.E.I.I.T.—National Research Center Turin-Italy, pp. 1-29, Stanford, Dec. 9, 2005.

(Continued)

*Primary Examiner* — Clayton E Laballe
*Assistant Examiner* — Noam Reisner (57) ABSTRACT

Embodiments of the present invention initially calculate a confidence score for the image environment surrounding the subject matter in order to determine the initial number of lens positions. Once the initial lens positions are determined, a sharpness score is calculated for each determined initial lens position. Using these sharpness scores, embodiments of the present invention generate a projection used to locate an estimated optimum focus position as well as to determine an estimated sharpness score at this lens position. Embodiments of the present invention then position the lens of the camera to calculate the actual sharpness score at the estimated optimum focus position, which is then compared to the estimated optimum sharpness score previously calculated. Based on this comparison, embodiments of the present invention dynamically determine whether it has a sufficient number of lens positions to determine the optimum focus position or if additional sample lens positions are needed.

21 Claims, 11 Drawing Sheets

(56) References Cited

U.S. PATENT DOCUMENTS

| | | |
|---|---|---|
| 7,309,932 B2 | 12/2007 | Tseng |
| 7,574,016 B2 | 8/2009 | Steinberg et al. |
| 7,623,774 B2 | 11/2009 | Rukes |
| 7,760,442 B2 | 7/2010 | Ishida et al. |
| 8,049,811 B2 | 11/2011 | Gamadia et al. |
| 8,340,512 B2 | 12/2012 | Garg, I et al. |
| 8,351,776 B2 | 1/2013 | Garg et al. |
| 8,368,255 B2 | 2/2013 | Park et al. |
| 8,581,957 B2 | 11/2013 | Bengtsson et al. |
| 9,031,393 B2 | 5/2015 | Zhang et al. |
| 2003/0123751 A1 | 7/2003 | Krishnamurthy et al. |
| 2003/0128756 A1 | 7/2003 | Oktem |
| 2005/0024487 A1 | 2/2005 | Chen |
| 2005/0109959 A1 | 5/2005 | Wasserman et al. |
| 2005/0207743 A1 | 9/2005 | Uehara |
| 2005/0275747 A1 | 12/2005 | Nayar et al. |
| 2006/0215924 A1 | 9/2006 | Steinberg et al. |
| 2006/0274643 A1 | 12/2006 | Choyi et al. |
| 2006/0291845 A1 | 12/2006 | Sugimoto |
| 2007/0104472 A1 | 5/2007 | Quan et al. |
| 2007/0206941 A1 | 9/2007 | Maruyama et al. |
| 2008/0043686 A1 | 2/2008 | Sperti et al. |
| 2008/0152245 A1 | 6/2008 | El-Maleh et al. |
| 2008/0225944 A1 | 9/2008 | Pore et al. |
| 2008/0240700 A1 | 10/2008 | Takagi |
| 2008/0266440 A1 | 10/2008 | Yazdanfar et al. |
| 2009/0088999 A1 | 4/2009 | Bryll et al. |
| 2009/0284850 A1 | 11/2009 | Huang et al. |
| 2010/0014099 A1 | 1/2010 | Christoph et al. |
| 2010/0067890 A1* | 3/2010 | Ogino .......................... 396/104 |
| 2010/0118316 A1 | 5/2010 | Mihaylov et al. |
| 2011/0058095 A1 | 3/2011 | Chou et al. |
| 2011/0069190 A1 | 3/2011 | Chou et al. |
| 2013/0070148 A1 | 3/2013 | Kim |
| 2013/0148011 A1 | 6/2013 | Chou |
| 2013/0169832 A1 | 7/2013 | Park et al. |
| 2014/0022443 A1 | 1/2014 | Tay |
| 2014/0192251 A1 | 7/2014 | Speltz et al. |

FOREIGN PATENT DOCUMENTS

| | | |
|---|---|---|
| WO | 2013098595 | 7/2013 |
| WO | 2014100516 | 6/2014 |

OTHER PUBLICATIONS

Lin Tong and K.R. Rao, "Region of Interest Based H.263 Compatible Codec and Itsrate Control for Low Bit Rate Video Conferecing", Proceedings of 2005 International Symposium on Intelligent Signal Processing and Communication Systems, pp. 249-252, Dec. 13-16, 2005.

Pierpaolo Baccichet, Xiaoqing Zhu, and Bernd Girod, "Network-Aware H.264/AVC Region-of-interest Coding for a Multi-Camera Wireless Surveilance Network", pp. 1-6, Downloaded Mar. 2007.

Yu Sun, Member, IEEE, Ishfaq Ahmad, Senior Member, IEEE, Songdong Li, Student Member, IEEE, and Ya-Qin Zhang, Fellow, IEEE, "Region-Based Rate Control and Bit Allocation for Wireless Video Transmission", IEEE Transactions on Multimedia, vol. 8, No. 1, pp. 1-10, Feb. 2006.

Jeng-Wei Chen, Mei-Juan Chen and Ming-Chieh Chi, "Region-of-Interest Video Coding Based on Face Detection", Springer-Verlag Berlin Heidelberg, pp. 1201-1211, Year 2002.

Yu Sun, Dongsong Li, Ishfaq Ahmad and Jiancong Luo, "A Rate Control Algorithm for Wireless Video Transmission Using Perceptual Tuning", Proceedings of the International Conference on Information Technology: Coding and Computing (ITCC'05), 0-7695-2315-3/05 IEEE, pp. 1-6, Mar. 2005.

"Ploynomial Approximation Emory Math Dept. Document"—Retrieved from Wayback Machine (http:/archive.org/web/) Jun. 2, 2010 @ link http://web.archive.org/web/20100701000000*/http://www.mathcs.emory.edu/~haber/math315/chap4.pdf.

* cited by examiner

Flow Chart 800

Figure 9

Flow Chart 900

Figure 10

METHOD AND SYSTEM FOR INTELLIGENT DYNAMIC AUTOFOCUS SEARCH

CROSS-REFERENCE TO RELATED APPLICATIONS

This application is related to patent application Ser. No. 13/645,188: "A METHOD AND SYSTEM OF CURVE FITTING FOR COMMON FOCUS MEASURES," concurrently filed with this application, which is herein incorporated by reference in its entirety.

FIELD OF THE INVENTION

Embodiments of the present invention are generally related to the field of devices capable of digitally capturing images using autofocus technology.

BACKGROUND OF THE INVENTION

Modern digital cameras utilize a feature known as "autofocusing" which is used to determine an accurate focus position prior to capturing an image. Determining an accurate focus position is essential to capturing the sharpest image possible. Autofocus systems generally employ an array of external focus sensors used for determining an accurate focus position as well as a motor to facilitate lens movement so that the lens is in position to capture an image at the determined focus level. These external focus sensors measure focus position through the use of beam splitting techniques in which one beam is directed into an image sensor used to capture the final image and the other beam is directed into the view finder of the camera.

However, many digital cameras, including those used in mobile devices, are not equipped with these external focus sensors and, thus, rely on the image sensor to perform autofocus functionality as well. Current autofocusing technology is inefficient in the sense that it takes longer than necessary to locate an optimum fixed lens position and often uses redundant lens positions in determining this optimum focus position. These inefficiencies are costly not only in terms wasted computation time, but also result in wasted power resources. Furthermore, these inefficiencies may lead to user frustration at not being able to instantaneously capture images of the sharpest quality.

SUMMARY OF THE INVENTION

Accordingly, a need exists to address the inefficiencies discussed above. Embodiments of the present invention provide a novel solution which initially calculates a confidence score for the image environment surrounding the subject matter in order to determine the initial number of lens positions. Once the initial lens positions are determined, a sharpness score is calculated for each determined initial lens position. Using these sharpness scores, embodiments of the present invention generate a projection used to locate an estimated optimum focus position as well as to determine an estimated sharpness score at this lens position.

Embodiments of the present invention then position the lens of the camera to calculate the actual sharpness score at the estimated optimum focus position, which is then compared to the estimated optimum sharpness score previously calculated. Based on this comparison, embodiments of the present invention dynamically determine whether it has a sufficient number of lens positions to determine the optimum focus position or if additional sample lens positions are needed.

More specifically, in one embodiment, the present invention is implemented as a method of autofocusing of a camera lens. The method includes determining an initial lens position dataset using a confidence score. In one embodiment, the initial lens position dataset contains a minimum of three values. In one embodiment, the initial lens position dataset values are so positioned spatially respective of a lowest possible value and a highest possible value of the initial lens position dataset.

The method of determining a preliminary lens position dataset step further includes detecting an image capturing condition prior to a capturing an image. The method of determining a preliminary lens position further includes calculating the confidence score based on the image capturing condition. The method of determining a preliminary lens position further includes evaluating the confidence score to determine if the confidence score is within a first predetermined threshold range. The method of determining a preliminary lens position further includes adding a predetermined number of values to the initial lens position dataset in response to the evaluating the confidence score step.

The method also includes relating the initial lens position dataset to an initial sharpness score dataset to locate an estimated optimum position. The method of relating further includes positioning the camera lens to calculate an initial sharpness score for each value of the initial lens position dataset producing a plurality of initial sharpness scores, in which the initial sharpness score dataset comprises of the plurality of initial sharpness scores. The method of relating also includes generating a function, in which the function relates the initial lens position dataset to the initial sharpness score dataset using a curve fitting analysis, in which the estimated focus position is represented using a vertex point on the function. In one embodiment, the curve fitting analysis uses polynomial regression analysis of various orders (e.g., $6^{th}$ order).

Additionally, the method includes comparing a predicted sharpness score to an actual sharpness score to validate the estimated focus position producing a validated estimated focus position as well as adjusting the camera lens to the validated estimated focus position. The method of comparing further includes estimating the predicted sharpness score for the estimated focus position using the relating step. The method of comparing further includes positioning the camera lens at the estimated focus position to calculate the actual sharpness score for the estimated focus position. Additionally, the method of comparing also includes determining a difference between the predicted sharpness score and the actual sharpness score to determine if the difference is within a second predetermined threshold range, in which if the difference is within the second predetermined threshold range, the estimated focus position is validated. Also, the method of comparing also includes adding the actual sharpness score to the initial sharpness score dataset in response to the difference not being within the second predetermined threshold range. Furthermore, the method of comparing further includes repeating the estimating process, the positioning process and the determining a difference process for a predetermined number of times.

In another embodiment, the present invention is directed to a system for autofocusing of a camera lens. The system includes a motor coupled to the camera lens, in which the motor is operable to move the camera lens. The system also includes an image capturing condition module operable to detect an image capturing condition prior to a capturing an image, in which the image capturing module is further operable to capture the image. The system further includes a controller operable to send control signals therefrom and receive control signals thereto, in which the controller is operable to adjust the camera lens.

The controller further includes a determination module operable to determine an initial lens position dataset and an initial sharpness score dataset using a confidence score. In one embodiment, the initial lens position dataset contains a minimum of three values. In one embodiment, the initial lens position dataset values are so positioned spatially respective of a lowest possible value and a highest possible value of the initial lens position dataset.

The determination module is further operable to calculate the confidence score based on the image capturing condition, in which the determination module is further operable to make an evaluation based on the confidence score to determine if the confidence score is within a first predetermined threshold range, in which the determination module is further operable to add a predetermined number of values to the initial lens position dataset in response to the evaluation.

The controller also includes a relating module operable to produce a relation to relate the initial lens position dataset to the initial sharpness score dataset to locate an estimated optimum focus position. The relating module is further operable to position the camera lens to calculate an initial sharpness score for each value of the initial lens position dataset producing a plurality of initial sharpness scores, in which the initial sharpness score dataset comprises of the plurality of initial sharpness scores, in which the relating module is further operable to generate a function, in which the function relates the initial lens position dataset to the initial sharpness score dataset using a curve fitting analysis, in which the estimated focus position is represented using a vertex point on the function. In one embodiment, the curve fitting analysis uses polynomial regression analysis of various orders (i.e., $6^{th}$ order).

Also, the controller further includes a comparison module operable to compare a predicted score to an actual score to validate the estimated focus position producing a validated estimated focus position. The comparison module is further operable to estimate the predicted score for the estimated focus position using the relation, in which the comparison module is further operable to position the camera lens at the estimated focus position to calculate the actual score for the estimated focus position, in which the comparison module is further operable to determine a difference between the predicted score and the actual score to determine if the difference is within a second predetermined threshold range.

If the difference is within the second predetermined threshold range, the estimated focus position is validated, in which the comparison module is further operable to add the actual score to the initial sharpness score dataset in response to the difference not being within the second predetermined threshold range, in which the actual score and the second score are of the same type of score, in which the comparison module is further operable to repeat the estimating, the positioning and the determining a difference processes for a predetermined number of times. The system also includes memory coupled to the controller.

In yet another embodiment, the present invention is implemented as a non-transitory computer readable medium for autofocusing of a camera lens. The method includes determining a first dataset of values using a first score. In one embodiment, the first dataset contains a minimum of three values. In one embodiment, the first dataset of values are so positioned spatially respective of a lowest possible value and a highest possible value of the first dataset of values. The method of determining a first dataset further includes detecting an image capturing condition prior to a capturing an image. The method of determining a first dataset also further includes calculating the first score based on the image capturing condition. Additionally, the method of determining a first dataset further includes evaluating the first score to determine if the first score is within a first predetermined threshold range. Furthermore, the method of determining a first dataset further includes adding a predetermined number of values to the first dataset in response to the evaluating the first score step.

The method of autofocusing also includes relating the first dataset to a second dataset of values to locate an estimated optimum position. The method of relating further includes positioning the camera lens to calculate a second score for each value of the first dataset producing a plurality of second scores, in which the second dataset comprises of the plurality of second scores. Also, the method of relating further includes generating a function, in which the function relates the first dataset to the second dataset using a curve fitting analysis, in which the estimated focus position is represented using a vertex point on the function. In one embodiment, the curve fitting analysis uses polynomial regression analysis of various orders (i.e., $6^{th}$ order).

Also, the method of autofocusing includes comparing a predicted score to an actual score to validate the estimated focus position producing a validated estimated focus position as well as adjusting the camera lens to the validated estimated focus position. The method of comparing further includes estimating the predicted score for the estimated focus position using the relating step. Also, the method of comparing further includes positioning the camera lens at the estimated focus position to calculate the actual score for the estimated focus position.

Additionally, the method of comparing further includes determining a difference between the predicted score and the actual score to determine if the difference is within a second predetermined threshold range, where if the difference is within the second predetermined threshold range, the estimated focus position is validated. Also, the method of comparing further includes adding the actual score to the second dataset in response to the difference not being within the second predetermined threshold range, in which the actual score and the second score are of the same type of score. Furthermore, the method of comparing further includes repeating the estimating step, the positioning step and the determining a difference step for a predetermined number of times.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Portions of the detailed description that follow are presented and discussed in terms of a process. Although operations and sequencing thereof are disclosed in a figure herein (e.g., FIG. 1) describing the operations of this process, such operations and sequencing are exemplary. Embodiments are well suited to performing various other operations or variations of the operations recited in the flowchart of the figure herein, and in a sequence other than that depicted and described herein.

As used in this application the terms controller, module, system, and the like are intended to refer to a computer-related entity, specifically, either hardware, firmware, a combination of hardware and software, software, or software in execution. For example, a module can be, but is not limited to being, a process running on a processor, an integrated circuit, an object, an executable, a thread of execution, a program, and or a computer. By way of illustration, both an application running on a computing device and the computing device can be a module. One or more modules can reside within a process and/or thread of execution, and a component can be localized on one computer and/or distributed between two or more computers. In addition, these modules can be executed from various computer readable media having various data structures stored thereon.

Figure 1:
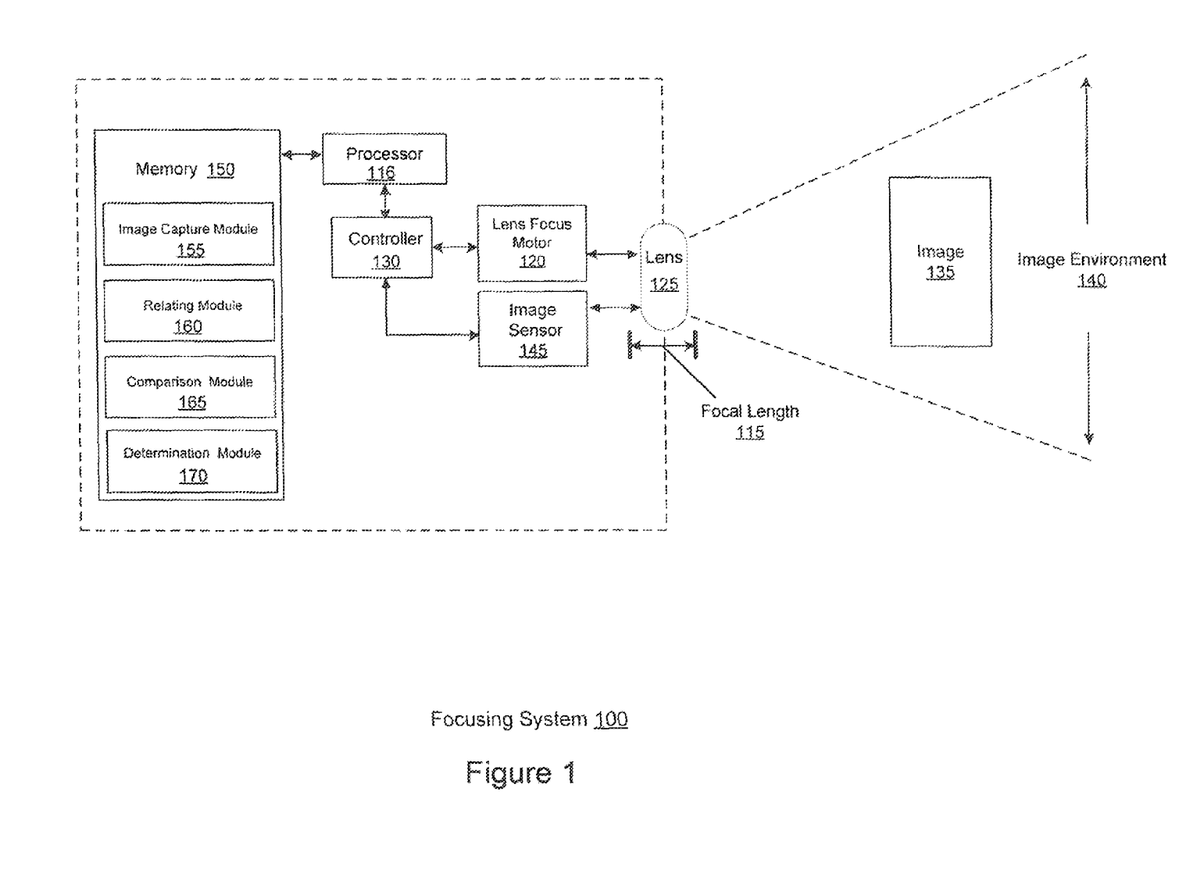
FIG. 1 is an exemplary depiction of a focusing system capable of implementing embodiments according to the present invention.

As presented in FIG. 1, an exemplary focus system 100 upon which embodiments of the present invention may be implemented is depicted. In an embodiment, focus system 100 may be implemented within a digital camera or any electronic device capable of capturing an image using an autofocus feature.

Focus system 100 receives image 135 through lens 125. Lens 125 is placed in a position determined by controller 130 which uses focus motor 120 as a mechanism to position lens 125. Focus motor 120 is operable to move lens 125 along lens focal length 115 which results in varying degrees of focus quality in terms of sharpness. Although focus system 100 depicts only lens 125 in the FIG. 1 illustration, embodiments of the present invention may support multiple lens configurations.

In determining focus positioning, controller 130 receives input from image capture module 155 which receives peripheral data from image environment 140. Image environment 140 is external to image 135 and may affect sharpness evaluation during the autofocusing analysis performed by embodiments of the present invention. Image Capture Module 155 measures conditions such as the brightness level surrounding the image within a given image environment 140 and may include natural illumination factors, such as daylight, or artificial illumination, such as the flash generated by a camera or indoor lighting.

Image Capture Module 155 also measures edges within a given image environment 140 using conventional edge detection technology. Additional conditions also include the distance between the subject being photographed and the camera as well as whether the subject is in motion.

Furthermore, image capture module 155 is communicably coupled to image sensor 145 which enables image capture module 155 to detect these conditions using conventional techniques to produce and process image 135 for analysis by embodiments of the present invention.

Determination Module 170 may be coupled to image capture module 155 and uses the data received through image sensor 145 to calculate a confidence score which is used by embodiments of the present invention to measure the dependability of sharpness scores, which will be described in greater detail infra. Higher confidence scores may be assigned to image environment 140 if it contains brighter lighting as well more edges within the scene, whereas lower confidence scores are assigned to darker scenes with fewer edges detected.

Using the confidence score that is calculated, determination module 170 compares the score to a predetermined confidence score threshold. Based on this comparison, a determination is made as to the number of initial lens positions to be used to determine an optimum focus position. In one embodiment of the present invention, if the confidence score is within the predetermined confidence score threshold, embodiments of the present invention may be configured to use a few as three initial lens position. However, if the confidence score is below the predetermined confidence score threshold, embodiments of the present invention may require more than three initial lens positions and up to a predetermined maximum number of initial lens positions.

Furthermore, the initial lens positions are predetermined by embodiments of the present invention and strategically placed along focal length 115. For example, for low confidence scores, predetermined lens positions may be spread out to cover the full range of focal length 115. Spreading out the initial lens positions in this manner enables embodiments of the present invention to provide a more accurate estimation of an optimum focus position. Similarly, for high confidence scores, in addition to providing a more accurate estimation of an optimum focus position, the predetermined lens positions may be placed close to each other in order to shorten the amount of time spent positioning lens 125 from one initial position to another. Positioning the initial lens positions in this manner encourages efficiency in terms of energy consumption as well as the time spent on capturing an image.

Figure 2:
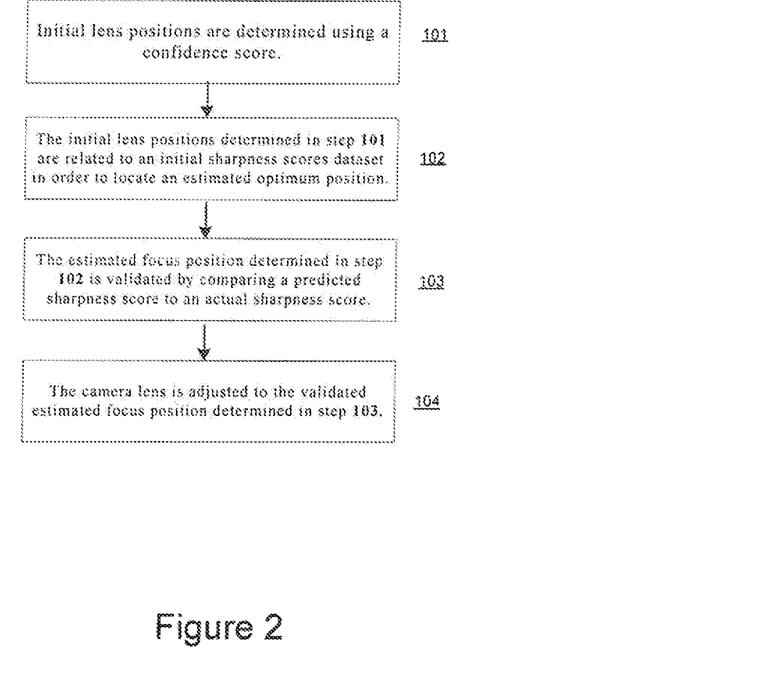
FIG. 2 depicts a flowchart of a process for determining a set of sample lens positions used for determining an optimum focus position in accordance with various embodiments of the present invention.

FIG. 2 presents a flow chart which describes exemplary steps in accordance with the various embodiments herein described.

At step 101, initial lens positions are determined using a confidence score.

At step 102, the initial lens positions determined in step 101 are related to an initial sharpness score dataset in order to locate an estimated optimum position.

At step 103, the estimated focus position determined in step 102 is validated by comparing a predicted sharpness score to an actual sharpness score.

At step 104, the camera lens is adjusted to the validated estimated focus position determined in step 103.

Figure 3:
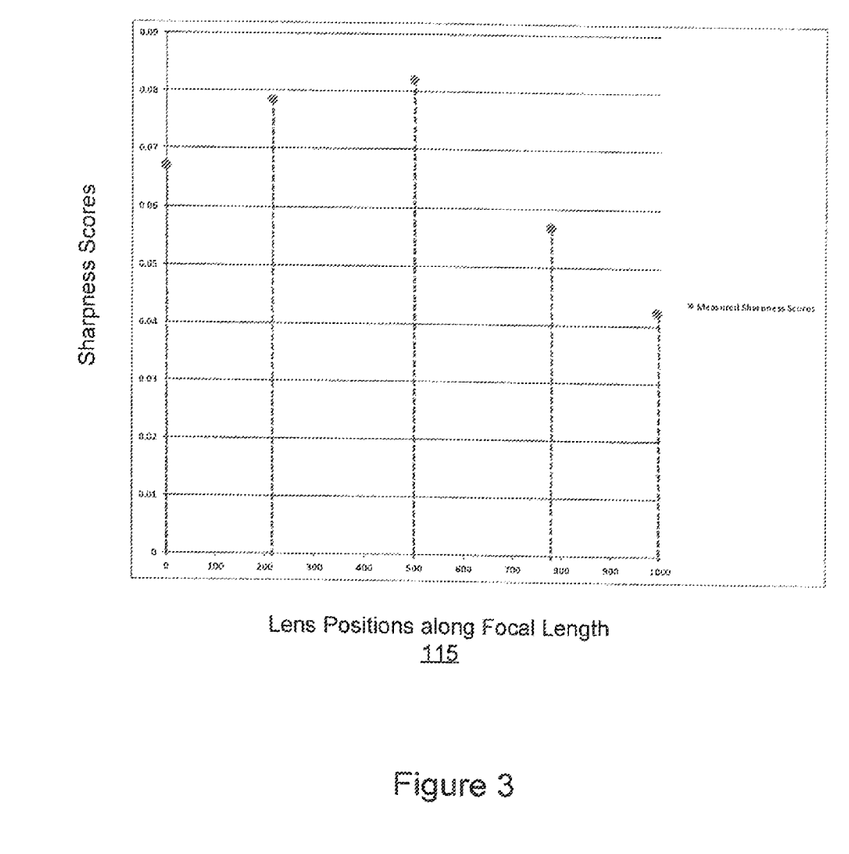
FIG. 3 is exemplary depiction of the sharpness score computation process for each determined lens position within an image environment producing a low confidence score in accordance with various embodiments of the present invention.

As presented in FIG. 3, with reference to FIG. 1, Relating Module 160 computes a sharpness score for each position once the initial lens positions are determined. Controller 130 receives instructions from Relating Module 160 to position lens 125 using lens motor 120. Therefore, through controller 130, Relating Module 160 positions lens 125 along focal length 115 to each of the initial lens positions to compute a sharpness score for each image at its corresponding lens position. As illustrated in FIG. 3, Relating Module 160 positions lens 125 at five different positions to compute a sharpness score for each image corresponding to each of the five positions. Additionally, FIG. 3 provides an example of a particularly "noisy" image environment 140, thus producing a low confidence score requiring more than three initial positions. Furthermore, embodiments of the present invention support conventional methods of computing sharpness scores of an image.

Figure 4:
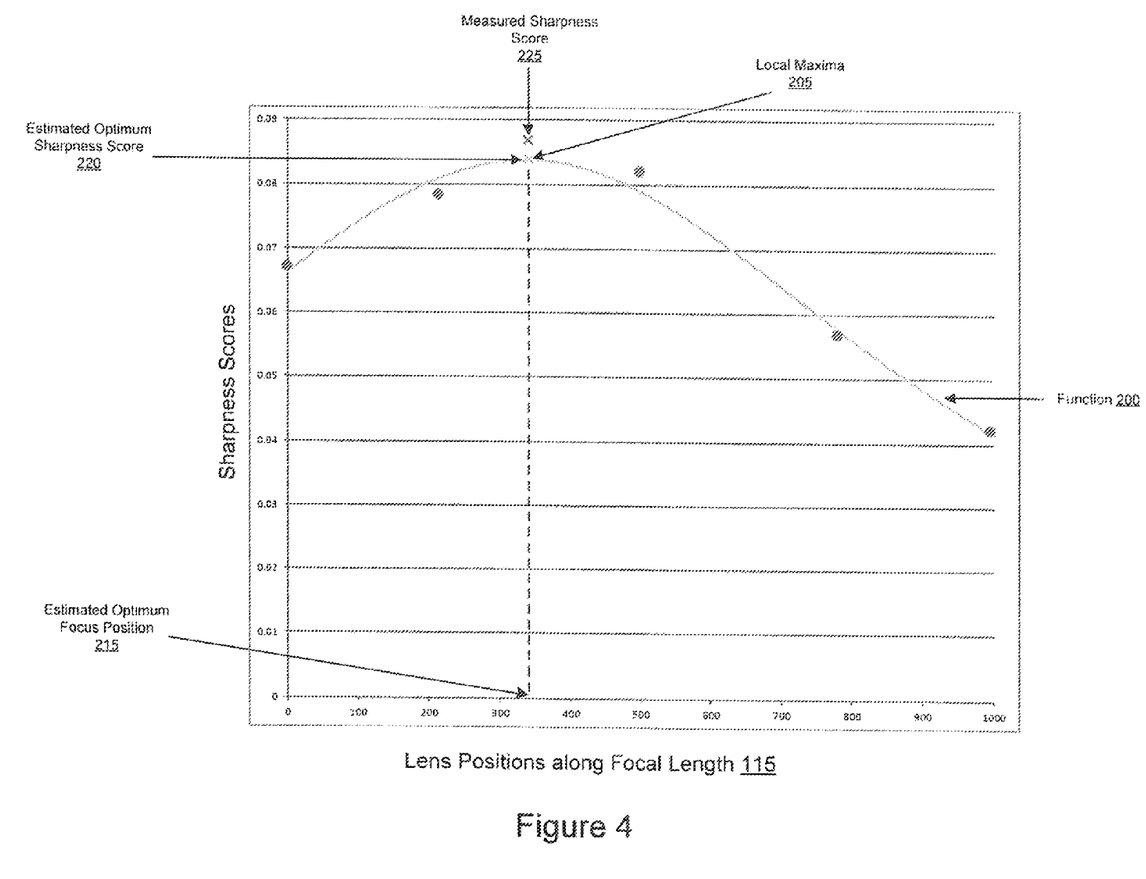
FIG. 4 depicts an exemplary function generated by embodiments of the present invention in which an estimated optimum focus position is determined within an image environment producing a low confidence score in accordance with various embodiments of the present invention.

As shown in FIG. 4, with reference to FIG. 1, embodiments of the present invention estimate an optimum focus position by plotting the sharpness scores produced by Relating Module 160 against their respective lens position using conventional polynomial curve fitting analysis which fits a polynomial curve over the computed sharpness scores. Once the sharpness scores are computed, Comparison Module 165 performs curve fitting analysis using the sharpness score data in order to locate an optimum focus position that enables lens 125 to capture the sharpest image possible. The function generated by Comparison Module 165 relates each computed sharpness score to its respective lens position. As depicted in FIG. 4, in one embodiment of the invention, Comparison Module 165 uses a $6^{th}$ order polynomial curve fitting analysis.

The resulting function generated produces a vertex point on the function which may be then used to determine if additional lens positions are needed to determine an optimum focus position. Local maxima 205 of function 200 provides a set of coordinates, e.g. (x,y), in which the x-coordinate represents an estimated optimum focus position 215 and the y-coordinate represents an estimated optimum sharpness score 220. Relating Module 160, through controller 130, will then position lens 125 along focal length 115 at the estimated optimum focus position 215 to compute a measured sharpness score 225 for the image at this position.

Measured sharpness score 225 allows embodiments of the present invention to make a determination as to whether an additional round of curve fitting analysis is needed or whether focus system 100 has enough lens positions to predict the optimum lens position where the sharpness of a given image, i.e. image 135, is expected to be the highest. As illustrated in FIG. 4, Relating Module 160 computes a measured sharpness score 225 that is higher than the estimated optimum sharpness score 220, which results in a relatively high error margin, e.g greater than 1%. Although FIG. 4 illustrates a scenario in which the relative margin of error is greater than 1%, embodiments of the present invention allow the user to adjust the relative margin of error to some other acceptable level.

Figure 5:
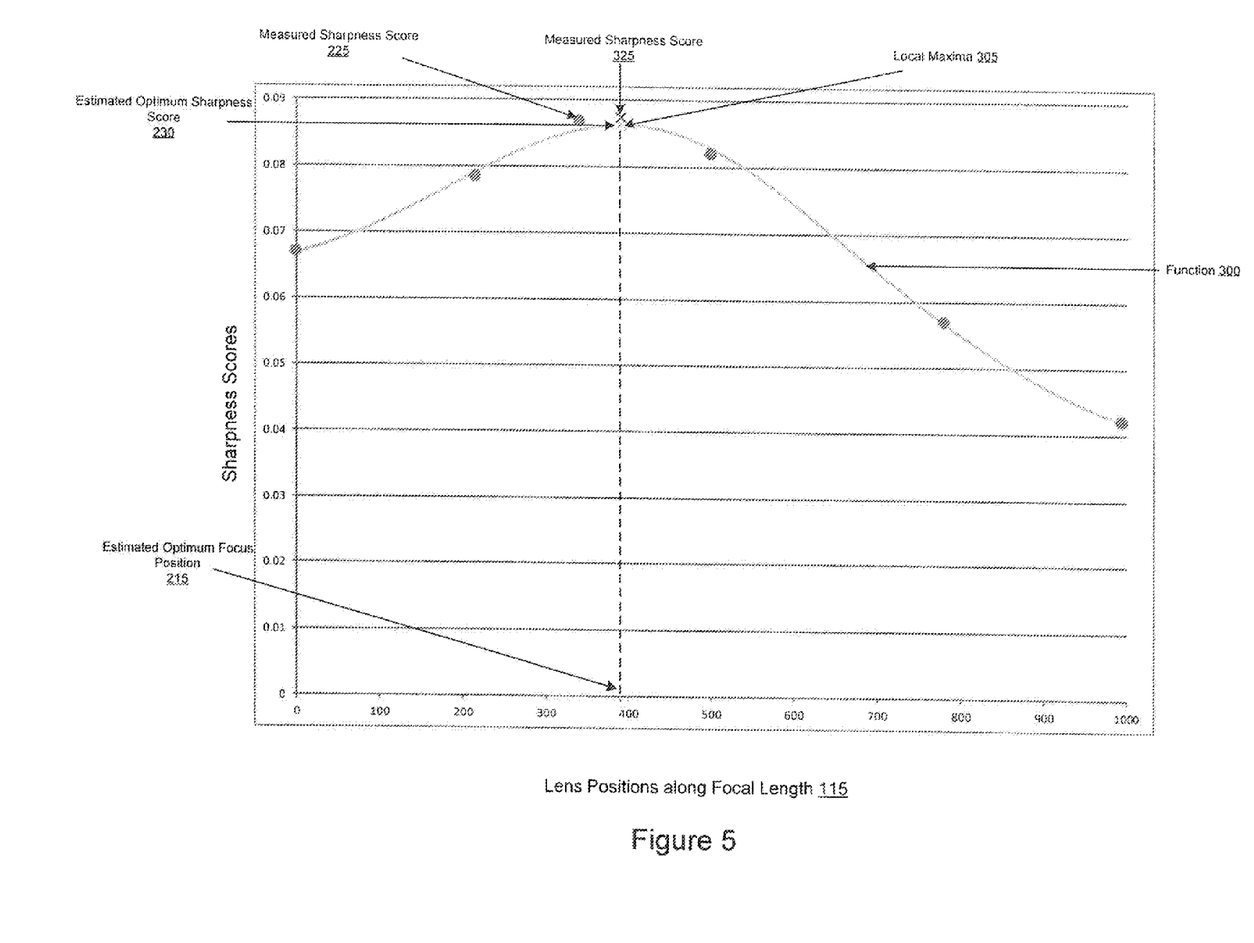
FIG. 5 depicts another exemplary function generated by embodiments of the present invention in which an estimated optimum focus position is determined within image environment producing a low confidence score in accordance with various embodiments of the present invention.

FIG. 5, with reference to FIG. 1, shows how embodiments of the present invention may use the previous expected focus position to produce an additional round of curve fitting analysis. As illustrated by FIG. 5, Comparison Module 165 performs a second curve fitting analysis, this time using the previous measured sharpness score 225 to generate function 300. Function 300 generates a local maxima 305 that produces an estimated optimum focus position 215 that not only closely corresponds with the newly measured sharpness score 325, but also produces an estimated optimum sharpness score value 230 that is now relatively close to measured sharpness score 325 and within an acceptable relative error margin threshold.

Figure 6:
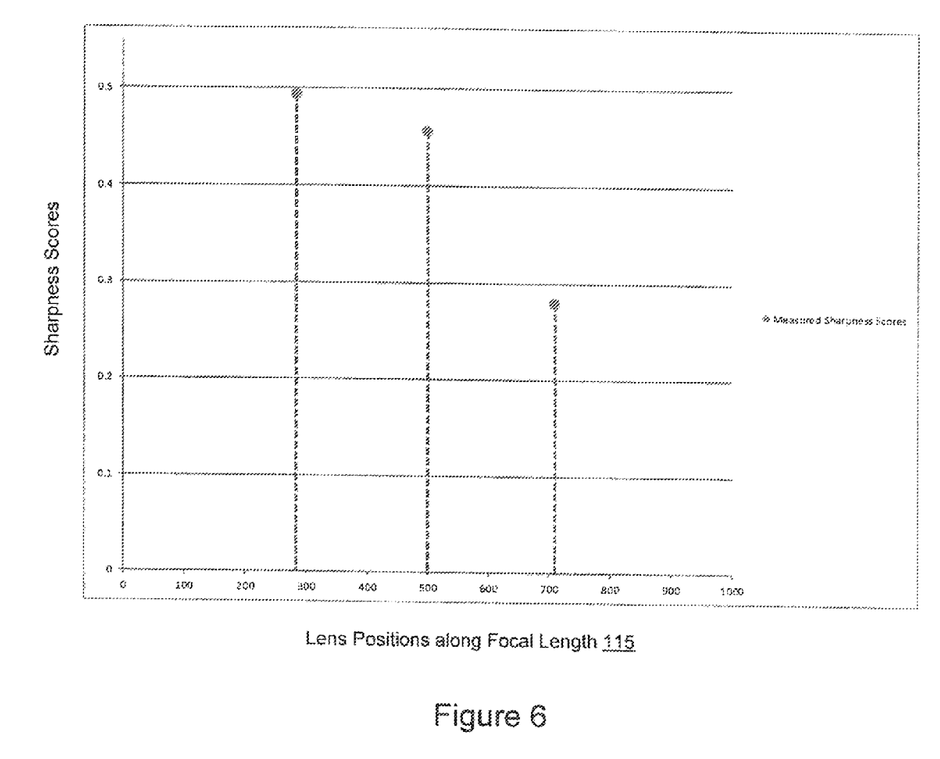
FIG. 6 is exemplary depiction of the sharpness score computation process for each determined lens position within an image environment producing a high confidence score in accordance with various embodiments of the present invention.

FIG. 6, with reference to FIG. 1, depicts an image environment 140 in which Image Capture Module 155 computes a high confidence score, therefore requiring only three initial positions. Relating Module 160 then proceeds to compute a sharpness score for each position once the initial lens positions are determined. Controller 130 receives instructions from Relating Module 160 to position lens 125 using lens motor 120. Therefore, through controller 130, Relating Module 160 positions lens 125 along focal length 115 to each of the determined initial lens positions to compute a sharpness score for each image at its corresponding lens position. As illustrated in FIG. 6, Relating Module 160 positions lens 125 at three different positions to compute a sharpness score for an image that corresponds to each of the three positions.

Figure 7:
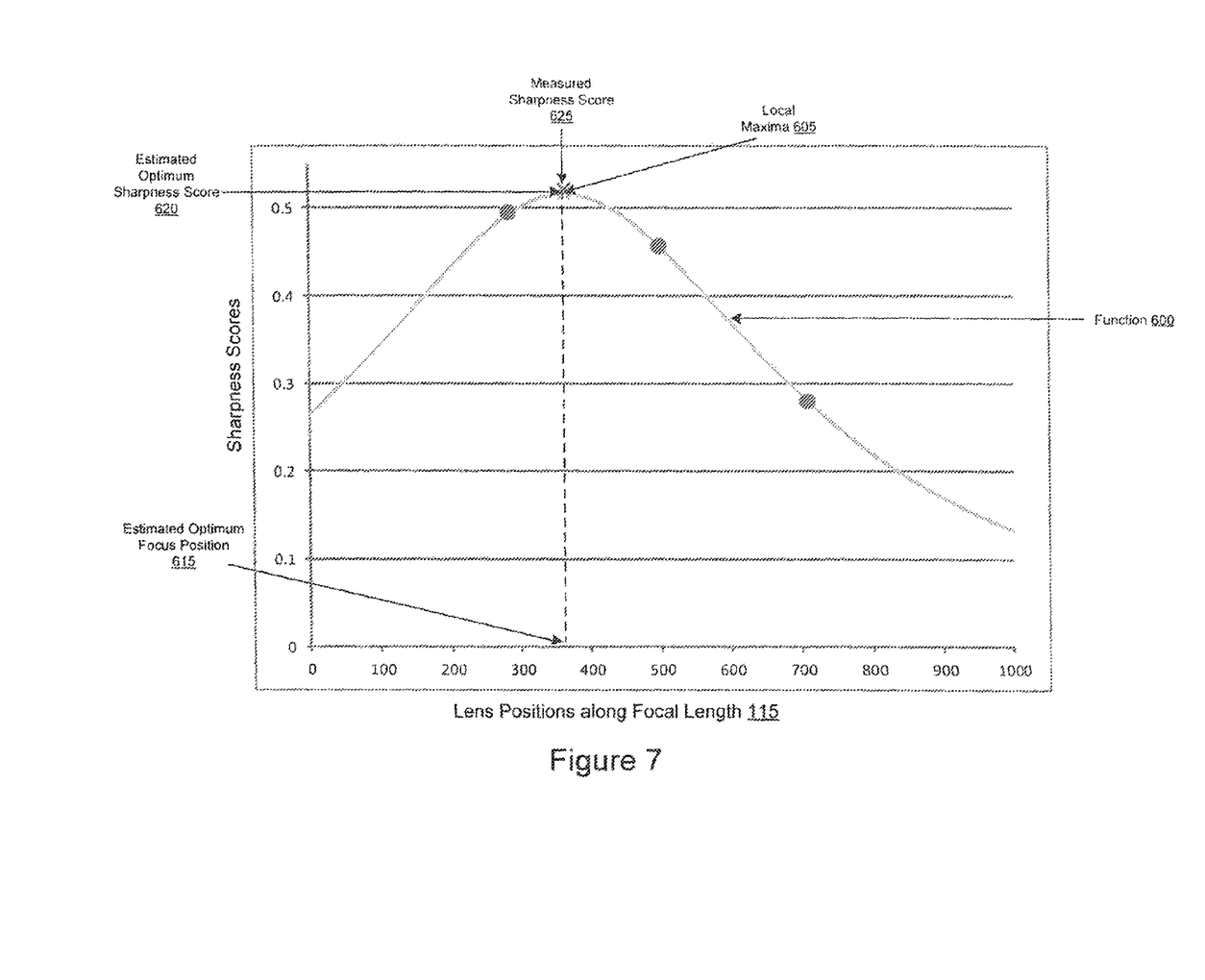
FIG. 7 depicts another exemplary function generated by embodiments of the present invention in which an estimated optimum focus position is determined within image environment producing a high confidence score in accordance with various embodiments of the present invention.

As shown in FIG. 7, embodiments of the present invention estimate the optimum focus position by plotting the sharpness scores produced by Relating Module 160 against their respective lens position using conventional polynomial curve fitting analysis which fits a polynomial curve over the computed sharpness scores. Once the sharpness scores are computed, Comparison Module 165 performs curve fitting analysis using the sharpness score data in order to determine an optimum focus position that enables lens 125 to capture the sharpest image possible. The function generated by Comparison Module 165 relates each computed sharpness score to its respective lens position. The resulting function generated produces a vertex point on the function which may be then used to determine if additional lens positions are need to determine an optimum focus position.

Local maxima 605 of function 600 provides a set of coordinates, e.g. (x,y), in which the x-coordinate represents an estimated optimum focus position 615 and the y-coordinate represents an estimated optimum sharpness score 620. Relating Module 160, through controller 130, will then position lens 125 along focal length 115 at the estimated optimum focus position 615 to compute a measured sharpness score 625 for the image at this position. As illustrated in FIG. 7, function 600 produces an estimated optimum focus position 615 that not only corresponds with measured sharpness score 625, but also produces an estimated optimum sharpness score value 620 that is now relatively close to measured sharpness score 625 and within an acceptable relative error margin threshold.

Although conventional curve fitting analysis may be performed by embodiments of the present invention, these embodiments also provide a novel approach that requires fewer initial lens positions than conventional methods, yet provide higher accuracy in determining an optimum focus position. Embodiments of the present invention may compute sharpness scores using gradient measuring techniques traditionally used to measure the sharpness of edges. Empirical data has shown that for focus measures using the gradient magnitude to compute sharpness, their sharpness scores are inversely proportional to an nth power of the lens position.

Based on this relationship, embodiments of the present invention suggest a curve fitting analysis approach in which a polynomial curve is fit over the reciprocal of sharpness scores, which may be represented as (1/sharpness score). Under this approach, conventional techniques using polynomial curve fitting are cut down by an order of three or four degrees and afford embodiments of the present invention the novel ability to perform better data extrapolation, in addition to conventional interpolation techniques.

Data interpolation provides embodiments of the present invention the ability to predict sharpness scores at any position within a discrete set of initial lens positions. However, the ability to extrapolate data allows embodiments of the present invention to determine future sampling lens positions outside the initial sampling lens positions. By determining lens positions in this manner, embodiments of the present invention promote efficiency in terms of both the computational time spent on autofocusing as well as the efficient use of the power resources available to the camera. In continuous autofocus schemes, the ability to extrapolate data is necessary to tell the camera lens focusing system which direction to move.

Figure 8A:
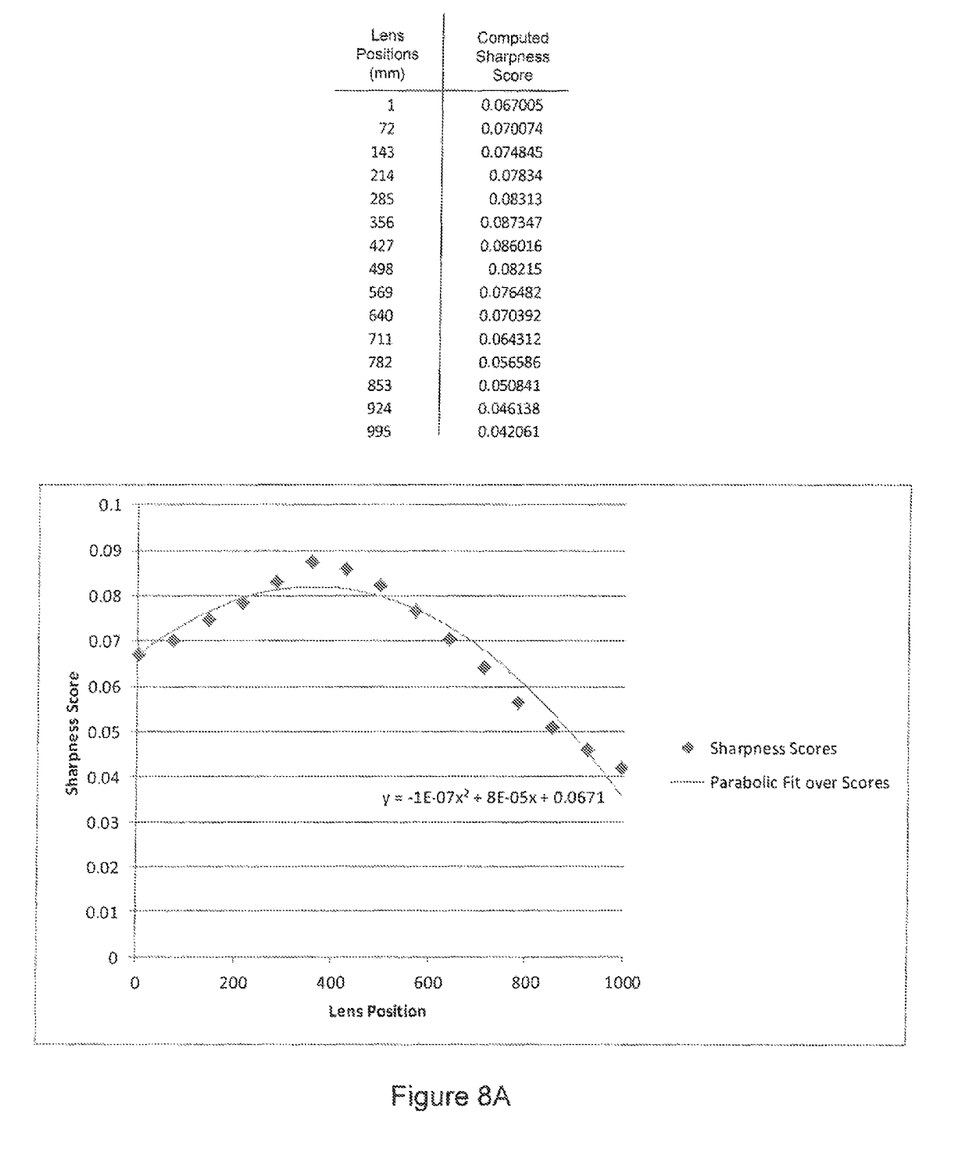
FIG. 8A depicts another exemplary function generated by embodiments of the present invention in which an estimated optimum focus position is determined using conventional curve fitting analysis in accordance with various embodiments of the present invention.

FIG. 8A provides a set of sharpness scores that may be used to calculate an estimated optimum focus position in accordance with embodiments of the present invention. As described above, sharpness scores may be computed using conventional techniques. FIG. 8A provides a set of fifteen sharpness scores computed at fifteen different lens positions.

As shown in FIG. 8A, embodiments of the present invention may estimate the optimum focus position using conventional curve fitting analysis approaches by plotting the sharpness scores produced by Relating Module 160 against their respective lens position using polynomial curve fitting analysis which fits a parabola over the computed sharpness scores.

Figure 8B:
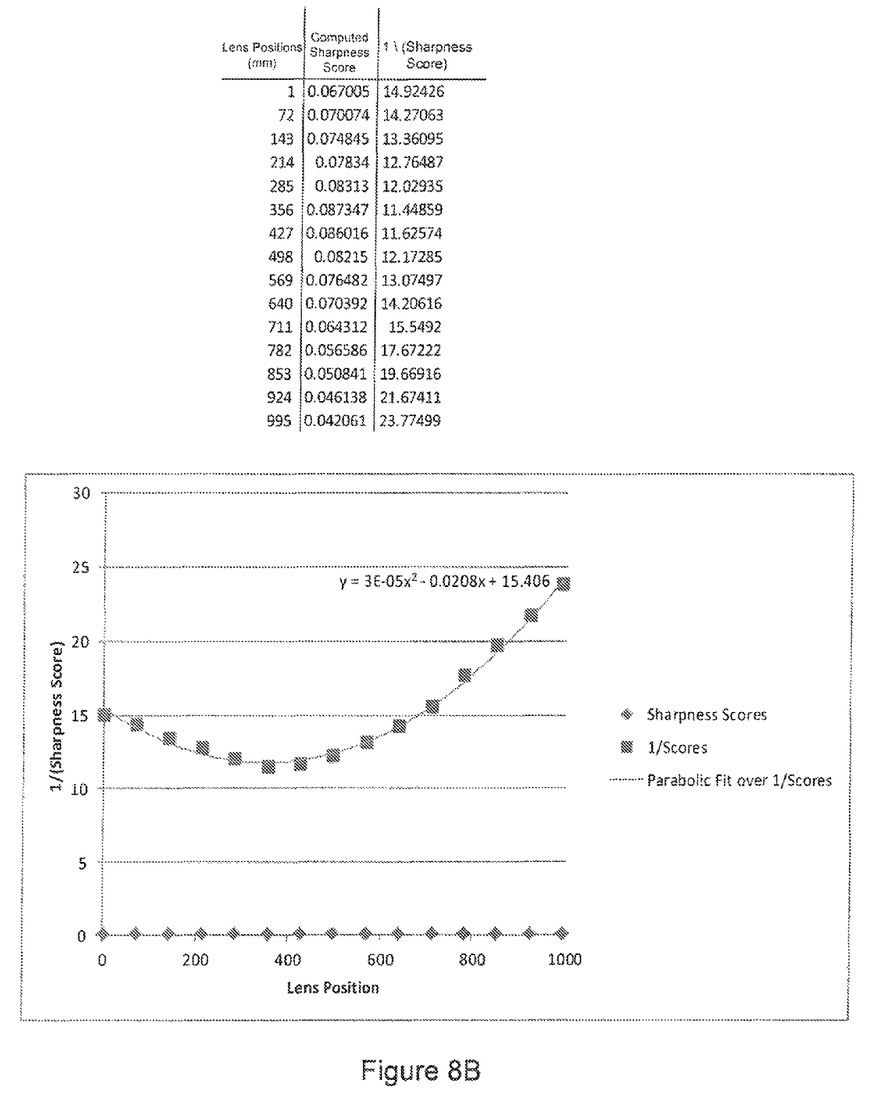
FIG. 8B depicts another exemplary function generated by embodiments of the present invention in which the reciprocal of computed sharpness scores is used to determine an estimated optimum focus position in accordance with various embodiments of the present invention.

FIG. 8B provides an exemplary depiction of how embodiments of the present invention may also utilize a novel approach to curve fitting analysis as it pertains to determining an optimum focus position. As discussed supra, embodiments of the present invention suggest a curve fitting analysis approach in which a polynomial curve is fit over the reciprocal of sharpness score, which may be represented as (1/sharpness score). Using the same lens positions and sharpness scores computed in FIG. 8A, embodiments of the present invention use an additional calculation which determines the reciprocal for each of the fifteen sharpness scores computed at their respective lens positions.

As shown in FIG. 8B, embodiments of the present invention may estimate the optimum focus position by plotting the inverted sharpness scores using Relating Module 160 against their respective lens position using polynomial curve fitting analysis. Furthermore, as illustrated by FIG. 8B, embodiments of the present invention produce a curve fitting analysis in which the parabola is much more tightly fitted over the sharpness scores, thus promoting a much more efficient focusing algorithm compared to conventional algorithms.

Figure 9:
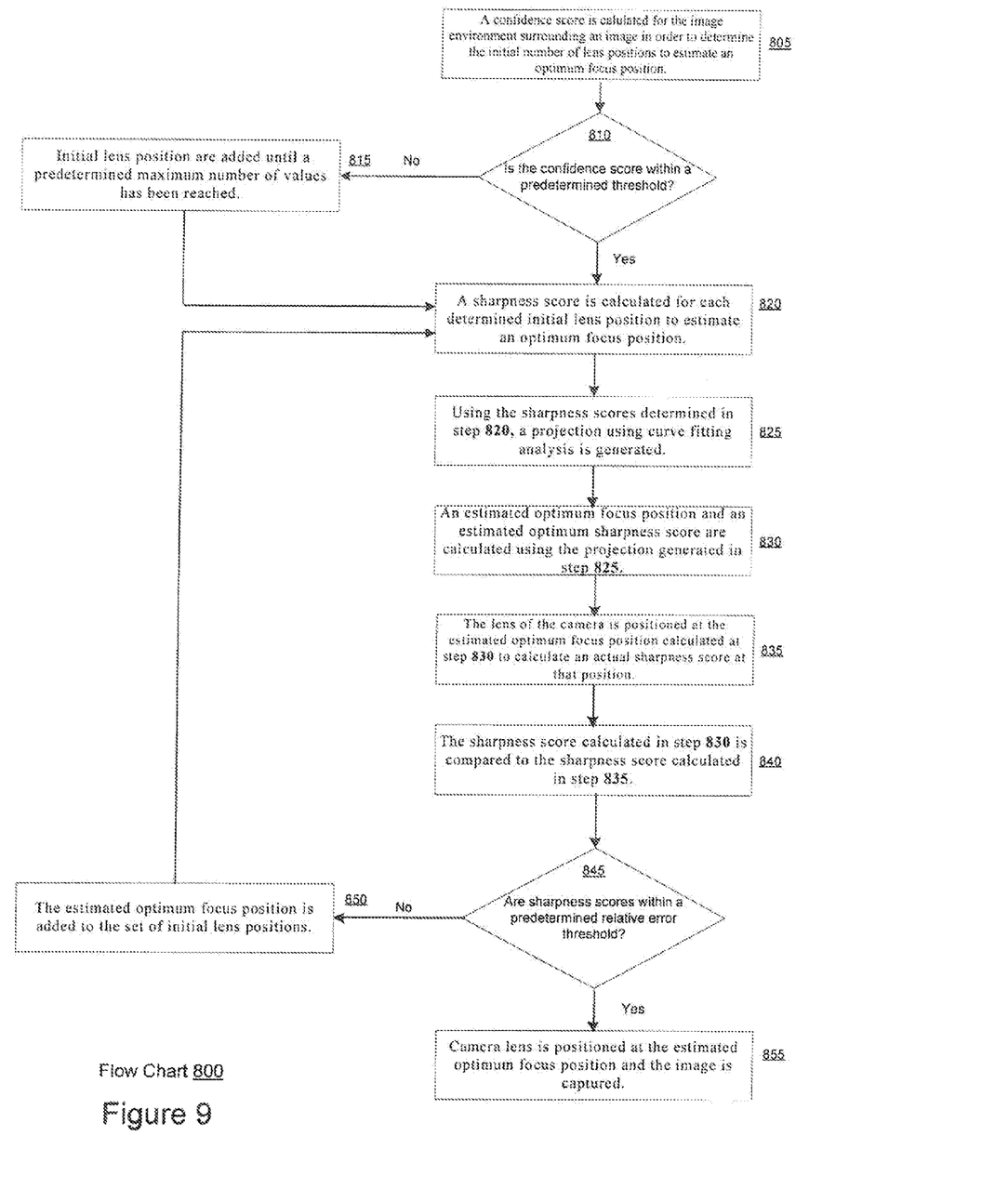
FIG. 9 depicts another flowchart of a process for determining a set of sample lens positions used for determining an optimum focus position in accordance with various embodiments of the present invention.

FIG. 9 presents flow chart 800 which is a flow chart that provides an example of a computer-implemented method for dynamically selecting initial lens positions for determining an optimum focus position in accordance with embodiments of the present invention. The flowchart 800 can be implemented as computer-executable instructions residing on some form of computer-readable storage medium.

At step 805, a confidence score is calculated for the image environment surrounding an image in order to determine the initial number of lens positions to estimate an optimum focus position.

At step 810, a determination is made as to whether the calculated confidence score is within a predetermined threshold. If the score is not within the threshold, then initial lens positions are added until a predetermined maximum number of values has been reached, as detailed in step 815. If the score is within the threshold, a sharpness score is calculated for each determined initial lens position to estimate an optimum focus position, as detailed in step 820.

At step 815, initial lens positions are added until a predetermined maximum number of values has been reached.

At step 820, a sharpness score is calculated for each determined initial lens position to estimate an optimum focus position.

At step 825, using the sharpness scores determined in step 820, a projection using curve fitting analysis is generated.

At step 830, an estimated optimum focus position and an estimated optimum sharpness score are calculated using the projection generated in step 825.

At step 835, the lens of the camera is positioned at the estimated optimum focus position calculated at step 830 to calculate the actual sharpness score at that lens position.

At step 840, the sharpness score calculated in step 830 is compared to the sharpness score calculated in step 835.

At step 845, a determination is made as to whether the estimated optimum sharpness score and the estimated optimum focus position are within a predetermined relative error threshold. If the score is not within the threshold, then the estimated optimum focus position is added to the set of initial lens position, as detailed in step 850. If the score is within the threshold, the estimated optimum focus position is determined as the actual optimum focus position, as detailed in step 855.

At step 850, the estimated optimum focus position is added to the set of initial lens positions.

At step 855, the camera lens is positioned at the estimated optimum focus position and the image is captured.

Figure 10:
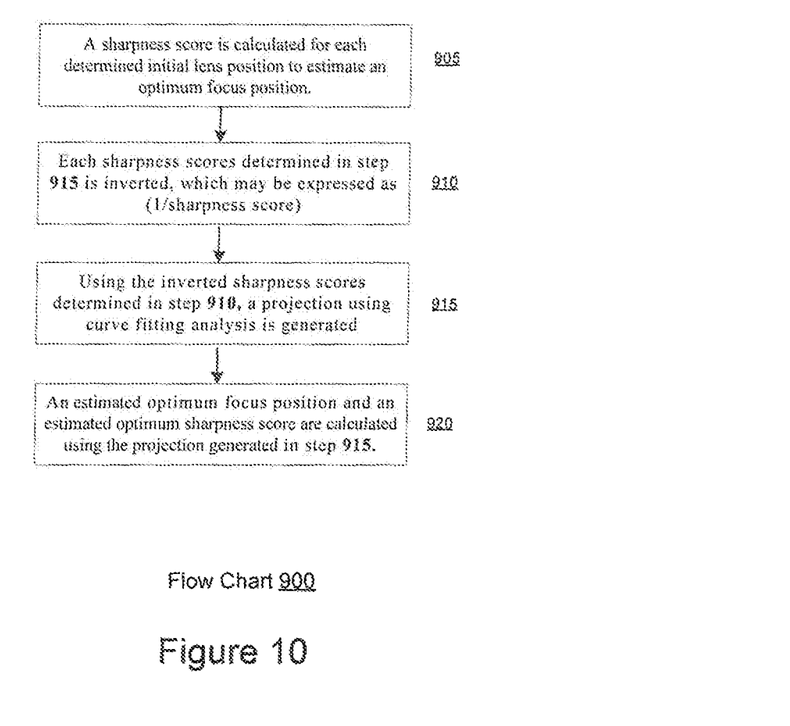
FIG. 10 depicts a flowchart of a process for interpolating and extrapolating a set of sample lens positions used for determining an optimum focus position in accordance with various embodiments of the present invention.

FIG. 10 presents flow chart 900 which is a flowchart of an example of a computer-implemented method for determining an efficient curve fitting analysis to determine an optimal focus position in accordance with embodiments of the present invention. Flowchart 900 may be implemented as computer-executable instructions residing on some form of computer-readable storage medium.

At step 905, a sharpness score is calculated for each determined initial lens position to estimate an optimum focus position.

At step 910, each sharpness scores determined in step 915 is inverted, which may be expressed as (1/sharpness score).

At step 915, using the inverted sharpness scores determined in step 910, a projection using curve fitting analysis is generated.

At step 920, an estimated optimum focus position and an estimated optimum sharpness score are calculated using the projection generated in step 915.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method of autofocusing of a camera lens, comprising:
   determining an initial lens position dataset using a confidence score;
   relating said initial lens position dataset to an initial sharpness score dataset to locate a focus position;
   comparing a predicted sharpness score to an actual sharpness score to validate said focus position by determining a difference between said predicted sharpness score and said actual sharpness score to determine if said difference is within a first predetermined threshold range, wherein if said difference is within said first predetermined threshold range, said focus position is validated;
   adding said actual sharpness score to said initial sharpness score dataset responsive to said difference being outside a first predetermined threshold range; and
   adjusting said camera lens to said validated focus position.

2. The method of autofocusing a camera lens described in claim 1, wherein said determining a preliminary lens position dataset step further comprises:
   detecting an image capturing condition prior to capturing an image;
   calculating said confidence score based on said image capturing condition;
   evaluating said confidence score to determine if said confidence score is within a second predetermined threshold range;
   adding a predetermined number of values to said initial lens position dataset responsive to evaluating said confidence score.

3. The method of focusing a camera lens described in claim 1, wherein said relating step further comprises:
   positioning said camera lens to calculate an initial sharpness score for each value of said initial lens position dataset producing a plurality of initial sharpness scores, wherein said initial sharpness score dataset comprises of said plurality of initial sharpness scores;
   generating a function, wherein said function relates said initial lens position dataset to said initial sharpness score dataset using a curve fitting analysis, wherein said focus position is represented using a vertex point on said function.

4. The method of autofocusing a camera lens described in claim 1, wherein said comparing step further comprises:
   estimating said predicted sharpness score for said focus position using said relating step;
   positioning said camera lens at said focus position to calculate said actual sharpness score for said focus position;
   repeating said estimating step, said positioning step and said determining step for a predetermined number of times.

5. The method of focusing a camera lens described in claim 1, wherein said initial lens position dataset contains a minimum of three values.

6. The method of focusing a camera lens in claim 3, wherein said curve fitting analysis uses polynomial regression analysis of various orders.

7. The method of focusing a camera lens described in claim 2, wherein said initial lens position dataset values are so positioned spatially respective of a lowest possible value and a highest possible value of said initial lens position dataset.

8. A system for autofocusing of a camera lens, comprising:
a motor coupled to said camera lens, wherein said motor is operable to move said camera lens;
an image capturing condition module operable to detect an image capturing condition prior to capturing an image, wherein further said image capturing module is operable to capture said image;
a controller operable to send control signals therefrom and receive control signals thereto, wherein said controller is operable to adjust said camera lens, said controller comprising:
a determination module operable to determine an initial lens position dataset and
an initial sharpness score dataset using a confidence score;
a relating module operable to produce a relation to relate said initial lens position dataset to said initial sharpness score dataset to locate a focus position;
a comparison module operable to compare a predicted score to an actual score to validate said focus position by determining a difference between said predicted score and said actual score to determine if said difference is within a first predetermined threshold range, wherein if said difference is within said first predetermined threshold range, said focus position is validated, wherein said comparison module is operable to add said actual score to said initial lens position dataset responsive to said difference being outside a first predetermined threshold range; and
a memory coupled to said controller.

9. The system for autofocusing of a camera lens described in claim 8, wherein said determination module is further operable to calculate said confidence score based on said image capturing condition, wherein further said determination module is operable to make an evaluation based on said confidence score to determine if said confidence score is within a second predetermined threshold range, wherein further said determination module is operable to add a predetermined number of values to said initial lens position dataset responsive to said evaluation.

10. The system for autofocusing of a camera lens described in claim 8, wherein said relating module is further operable to position said camera lens to calculate an initial sharpness score for each value of said initial lens position dataset producing a plurality of initial sharpness scores, wherein said initial sharpness score dataset comprises of said plurality of initial sharpness scores, wherein further said relating module is operable to generate a function, wherein said function relates said initial lens position dataset to said initial sharpness score dataset using a curve fitting analysis, wherein said focus position is represented using a vertex point on said function.

11. The system for autofocusing of a camera lens described in claim 8, wherein said comparison module is further operable to estimate said predicted score for said focus position using said relation, wherein further said comparison module is operable to position said camera lens at said focus position to calculate said actual score for said focus position, wherein further said comparison module is further operable to repeat said estimating, said positioning and said determining for a predetermined number of times.

12. The system for autofocusing of a camera lens described in claim 8, wherein said initial lens position dataset contains a minimum of three values.

13. The system for autofocusing of a camera lens described in claim 10, wherein said curve fitting analysis uses polynomial regression analysis of various orders.

14. The system for autofocusing of a camera lens described in claim 9, wherein said initial lens position dataset values are so positioned spatially respective of a lowest possible value and a highest possible value of said initial lens position dataset.

15. A non-transitory computer readable medium for autofocusing of a camera lens, comprising:
determining a first dataset of values using a first score;
relating said first dataset to a second dataset of values to locate a focus position;
comparing a predicted score to an actual score to validate said focus position by determining a difference between said predicted score and said actual score to determine if said difference is within a first predetermined threshold range, wherein if said difference is within said first predetermined threshold range, said focus position is validated;
adding said actual score to said second dataset responsive to said difference being outside a first predetermined threshold range; and
adjusting said camera lens to said validated estimated focus position.

16. The computer readable medium described in claim 15, wherein said determining a first dataset step further comprises:
detecting an image capturing condition prior to capturing an image;
calculating said first score based on said image capturing condition;
evaluating said first score to determine if said first score is within a second predetermined threshold range;
adding a predetermined number of values to said first dataset responsive to said evaluating said first score step.

17. The computer readable medium described in claim 15, wherein said relating step further comprises:
positioning said camera lens to calculate a second score for each value of said first dataset producing a plurality of second scores, wherein said second dataset comprises of said plurality of second scores;
generating a function, wherein said function relates said first dataset to said second dataset using a curve fitting analysis, wherein said focus position is represented using a vertex point on said function.

18. The computer readable medium described in claim 15, wherein said comparing step further comprises:
estimating said predicted score for said focus position using said relating step;
positioning said camera lens at said focus position to calculate said actual score for said focus position; and
repeating said estimating step, said positioning step and said determining step for a predetermined number of times.

19. The computer readable medium described in claim 15, wherein said first dataset contains a minimum of three values.

20. The computer readable medium described in claim 17, wherein said curve fitting analysis uses polynomial regression analysis of various orders.

21. The method of focusing a camera lens described in claim 16, wherein said first dataset of values are so positioned spatially respective of a lowest possible value and a highest possible value of said first dataset of values.

* * * * *